No. 740,558. PATENTED OCT. 6, 1903.
W. E. HAMILTON.
ADJUSTABLE TRUCK WHEEL.
APPLICATION FILED JAN. 17, 1903.

NO MODEL.

Witnesses:
Roscoe A. Johnson,
S. P. McKelvey.

Inventor,
William E. Hamilton,
By Glenn S. Noble
Att'y.

THE NORRIS PETERS CO., PHOTO-LITHO., WASHINGTON, D. C.

No. 740,558.

Patented October 6, 1903.

UNITED STATES PATENT OFFICE.

WILLIAM E. HAMILTON, OF ZANESVILLE, OHIO.

ADJUSTABLE TRUCK-WHEEL.

SPECIFICATION forming part of Letters Patent No. 740,558, dated October 6, 1903.

Application filed January 17, 1903. Serial No. 139,483. (No model.)

*To all whom it may concern:*

Be it known that I, WILLIAM E. HAMILTON, a citizen of the United States, residing at Zanesville, in the county of Muskingum and State of Ohio, have invented certain new and useful Improvements in Adjustable Truck-Wheels, of which the following is a specification.

This invention relates to means whereby the wheel-base of a truck or wheeled vehicle may be lengthened or shortened, as desired. Its objects are to provide means for the purpose indicated which will be simple and strong in construction, easily operated, and durable and efficient.

It comprises the combination of a suitable truck-frame with one or more sets of adjustable wheels, the combination with a suitable truck-frame of longitudinally-adjustable wheels, means for performing such adjustment, and means for locking the wheels in adjusted position, and such novel features and details of construction as will be described and claimed hereinafter.

Figure 1:
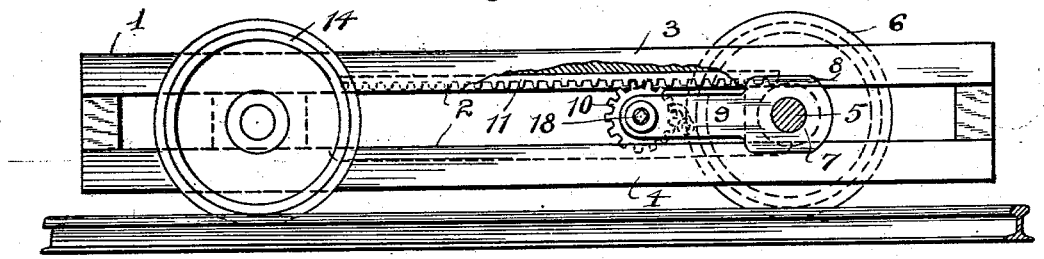
Figure 2:
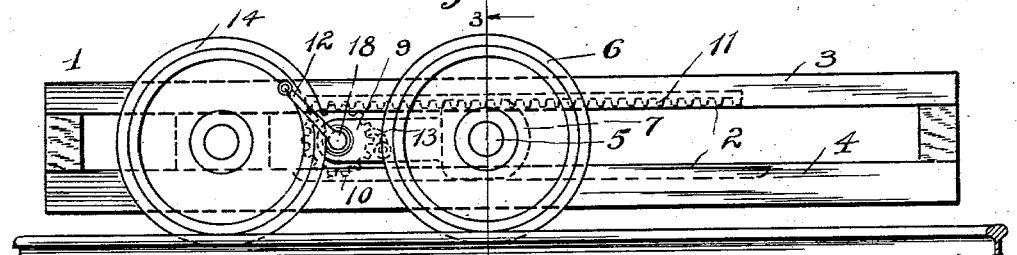
Figure 3:
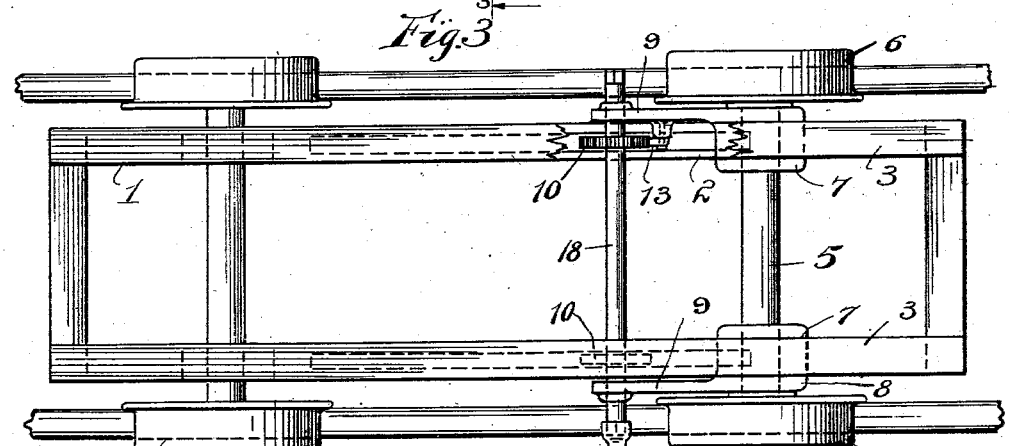
Figure 4:
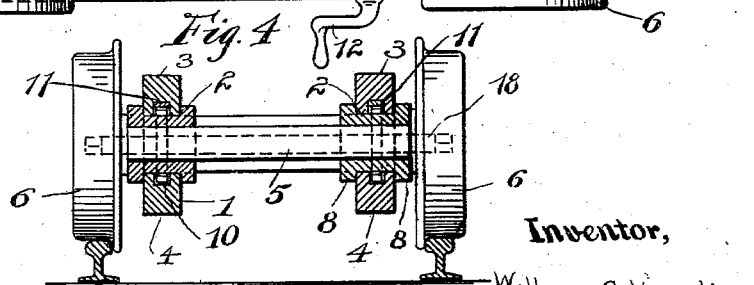

In the drawings forming a part of this application, Figure 1 is a side elevation of a truck provided with wheel-adjusting mechanism comprising this invention. Fig. 2 is a view similar to Fig. 1, showing the wheels adjusted for a short base. Fig. 3 is a plan view, and Fig. 4 is a sectional view taken on line 3 3 of Fig. 2 looking in the direction indicated by the arrows.

In railway-trucks adapted to carry operative machines and for other various purposes it is often desirable to have a long wheel-base—as, for instance, when the machine carried is in operation. If such a wheel-base is provided with the wheels rigidly secured to the truck-frame, it is often impossible to run the truck around sharp curves.

With my improved truck the wheels may be adjusted longitudinally to any desired position, so that a long wheel-base may be provided when desired, and then the wheels brought near together when the truck is being moved and it becomes necessary to pass curves. To this end any suitable truck-frame 1 is provided with ways 2, preferably formed by the longitudinal beams 3 and 4. The axle 5, with the wheels 6, is provided with slidable bearings 7, which engage the ways 2 and have flanges 8 to prevent disengagement. While in some instances this would be sufficient to form an operable device, I have provided means for adjusting the wheels along the ways and means whereby the ends of the axle will be caused to move in unison, so that one wheel will not be ahead of the other and out of alinement with the frame.

A shaft 18, having bearings in arms 9, extending from the axle-bearings 7, carries a pair of pinions 10, rigidly secured thereto. These pinions engage with racks 11, secured to the beams 3, a preferred arrangement being to have the racks countersunk in grooves in the under side of the top beams, so that the bearings 7 may pass freely under the same. At either end the shaft 18 is squared to engage with a crank 12, by means of which it is turned. A lock-pawl 13 on the arm 9 is adapted to lock the pinion in any desired position. The other set of wheels, 14, with their axles and bearings, may also be provided with a similar adjustment apparatus; but this is not illustrated, as it would be simply a duplication of that shown.

The operation of this device is readily understood from the drawings and description. To change the wheel-base, the pawl is disengaged, the crank placed in position, and the shaft 18 turned in the direction desired. Through the other devices shown this will cause the axle and wheels to be moved in the direction desired. The cranks may then be removed and the wheels again locked in position by the pawl.

Having thus described my invention, what I claim, and desire to secure by Letters Patent, is—

1. In combination, a truck-frame, wheels and axles for said frame, and means for adjusting said wheels and axles for a substantial distance along said frame, whereby the wheel-base may be sufficiently shortened to allow said truck to run around comparatively sharp curves as described.

2. In combination, a truck-frame, wheels and axles for said frame, and means for forcibly adjusting said wheels and axles forward and back a substantial distance along said frame whereby the wheel-base may be sufficiently shortened to allow the truck to pass around comparatively sharp curves and the wheels again forced back to form an elongated base, substantially as described.

3. In combination, a frame, wheels and axles for said frame, ways in said frame, bearings for said axles adapted to slide in said ways, arms on said bearings, a shaft carried by said arms, pinions on said shaft, racks secured to said frame with which the pinions engage, and means for turning said shaft.

4. In combination, a frame, a pair of wheels provided with an axle, longitudinal ways in said frame adjacent to each wheel, bearings for said axle engaging said ways, arms from said bearings carrying a shaft parallel to the axle, pinions on said axle, racks secured in the upper beams forming the ways engaging said pinions, a crank for turning the shaft and a lock-pawl to engage one of said pinions.

WILLIAM E. HAMILTON.

Witnesses:
J. F. LINTON,
O. E. HALTERMAN.